(12) United States Patent
Chugh et al.

(10) Patent No.: US 11,999,417 B2
(45) Date of Patent: Jun. 4, 2024

(54) STEERING ANGLE CONTROL USING HAPTIC CONTROLLER

(71) Applicant: Volvo Car Corporation, Gothenburg (SE)

(72) Inventors: Tushar Chugh, Gothenburg (SE); David Dahlgren, Gothenburg (SE); Fredrik Bruzelius, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 299 days.

(21) Appl. No.: 17/536,546

(22) Filed: Nov. 29, 2021

(65) Prior Publication Data

US 2023/0166789 A1    Jun. 1, 2023

(51) Int. Cl.
| | |
|---|---|
| *B62D 5/04* | (2006.01) |
| *B60W 50/16* | (2020.01) |
| *B62D 6/00* | (2006.01) |
| *B62D 6/10* | (2006.01) |
| *B62D 15/00* | (2006.01) |
| *B62D 15/02* | (2006.01) |
| *G06F 3/00* | (2006.01) |

(52) U.S. Cl.
CPC ........... *B62D 5/0463* (2013.01); *B62D 6/008* (2013.01); *B62D 6/10* (2013.01); *B62D 15/025* (2013.01)

(58) Field of Classification Search
CPC .. G06F 3/00; G06F 3/016; B62D 5/00; B62D 5/04; B62D 5/0463; B62D 6/008; B62D 6/10; B62D 15/00; B62D 15/025; B60W 2050/0008; B60W 20/16; B60K 2026/022
See application file for complete search history.

(56) References Cited

U.S. PATENT DOCUMENTS

| | | | | |
|---|---|---|---|---|
| 4,715,012 A | * | 12/1987 | Mueller, Jr. | ....... G05D 23/1917 701/50 |
| 6,651,771 B2 | | 11/2003 | Chabaan | |
| 7,853,379 B2 | | 12/2010 | Klier et al. | |
| 8,249,777 B2 | | 8/2012 | Greul et al. | |
| 8,352,125 B2 | | 1/2013 | Gruener et al. | |
| 9,499,193 B2 | | 11/2016 | Kageyama et al. | |
| 9,896,122 B2 | | 2/2018 | Endo et al. | |
| 10,625,780 B2 | | 4/2020 | Mardh et al. | |
| 10,640,145 B2 | * | 5/2020 | Mardh | ................. G05D 1/0212 |
| 10,988,166 B2 | | 4/2021 | Giersiefer et al. | |

(Continued)

FOREIGN PATENT DOCUMENTS

| | | | | |
|---|---|---|---|---|
| EP | 3882106 A1 | | 9/2021 | |
| EP | 3738860 B1 | * | 1/2022 | ........... B62D 15/025 |

(Continued)

*Primary Examiner* — Yonel Beaulieu
(74) *Attorney, Agent, or Firm* — Amin, Turocy & Watson, LLP

(57) ABSTRACT

In one or more embodiments described herein, devices, systems, methods and/or apparatuses are described that can facilitate provision of a single motor torque request based on a driver assistance system pinion angle request. The motor torque request can be generated absent arbitration between two or more requests from two or more different controller components. A device can comprise a steering control system that generates a motor torque request based on a single request from a single first controller component.

20 Claims, 10 Drawing Sheets

(56) References Cited

U.S. PATENT DOCUMENTS

| | | | |
|---|---|---|---|
| 11,679,717 B2* | 6/2023 | Chugh | B60Q 9/00 |
| | | | 340/438 |
| 11,872,989 B2* | 1/2024 | Otanez | B60W 40/105 |
| 2004/0148080 A1 | 7/2004 | Ekmark et al. | |
| 2009/0125188 A1 | 5/2009 | Broecker et al. | |
| 2016/0339910 A1* | 11/2016 | Jonasson | B60W 10/20 |
| 2018/0026512 A1 | 1/2018 | Onodera | |
| 2018/0265128 A1 | 9/2018 | Mardh et al. | |
| 2020/0361526 A1* | 11/2020 | Stoltze | B62D 15/025 |
| 2021/0291731 A1 | 9/2021 | Chugh et al. | |

FOREIGN PATENT DOCUMENTS

| | | |
|---|---|---|
| JP | 6812806 B2 | 1/2021 |
| WO | 2012037995 A1 | 3/2012 |

* cited by examiner

STEERING ANGLE CONTROL USING HAPTIC CONTROLLER

BACKGROUND

Steering control systems can employ one or more measurements and/or sensed forces, torques and/or angles to smoothly control movement generated by a movement system, such as of a vehicle. For example, pinion angle, pinion torque, rack force and/or the like can be employed to provide one or more requests and/or instructions to a motor controller of the movement system, such as to a rack and/or to steering control.

The steering control can include one or more experiences or haptic feedback to an entity that can be increased or be different than what the entity may sense or feel absence the haptic experience. The steering control can apply one or more forces, torques, motions, vibrations and/or the like. The steering control can comprise and/or coupled with a controller, a joystick, a steering wheel, an armrest, a seat port and/or the like, which can be an interface for the entity relative to the steering control.

SUMMARY

The following presents a summary to provide a basic understanding of one or more embodiments described herein. This summary is not intended to identify key or critical elements, or to delineate any scope of the one or more embodiments and/or any scope of the claims. The sole purpose of the summary is to present concepts in a simplified form as a prelude to the more detailed description that is presented later. In one or more embodiments described herein, devices, systems, methods and/or apparatuses are described that can facilitate provision of a single motor torque request based on a driver assistance system pinion angle request. The motor torque request can be generated absent arbitration between two or more requests from two or more different controllers.

As used herein, the terms "entity", "requesting entity" and "user entity" can refer to a machine, device, component, hardware, software, smart device and/or human.

According to one embodiment, a device can comprise a steering control system that generates a motor torque request based on a single request from a single first controller component.

According to another embodiment, a method can comprise generating, by a steering control system, a motor torque request based on a single request from a single first controller component.

According to yet another embodiment, a system can comprise a vehicle comprising a steering control system that generates a motor torque request based on a single request from a single first controller component.

In one or more embodiments of the device, method and/or system, the single request can comprise a pinion torque request or a pinion angle request.

In one or more embodiments of the device, method and/or system, the single request and the motor torque request can be generated, by the system, during different, non-overlapping time intervals.

In one or more embodiments of the device, method and/or system, the steering control system can generate the motor torque request absent arbitration between two or more requests from two or more different controller components, including the first controller component.

In one or more embodiments, the steering control system can generate the single request based on an angle request from a driver assistance system.

An advantage of the one or more devices, systems and/or methods can be generation of a motor torque request absent conflict between two or more motor torque request signals. One signal taking precedence or prioritization over the other can be avoided, in view of only a single motor torque request from a single controller component being generated. Arbitration between a pair of motor torque request signals also can be avoided. Rather, a pair of controllers (e.g., first controller component and second controller component) are operated in series in a closed system, rather than the pair of controller components being operated at least partially in parallel to generate conflicting motor torque request signals. That is, the pair of controller components are operated at different non-overlapping time intervals, wherein one controller component operates based upon an output from the other controller component.

DESCRIPTION OF THE DRAWINGS

One or more exemplary embodiments are described below in the Detailed Description section with reference to the following drawings.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It will be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it will be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

While one or more devices and/or systems are described below with reference to a wheeled vehicle, such as an automobile, the one or more embodiments described herein are not limited to this use. A steering control system described herein can be implemented with any suitable electronic system such as, for instance, an electric driveline of an electric vehicle (EV). Indeed, the one or more devices and/or systems described herein can be utilized with any of a military vehicle, marine vehicle such as a boat or marine drone, winged vehicle such as a plane, and/or rotor-ed vehicle such as a helicopter or drone. Likewise, usage can extend to a robot and/or any suitable mobile and/or stationary device having use of a haptic and/or steering control system.

Turning now to the figures, one or more embodiments described herein can include one or more devices, systems, apparatuses and/or system-implemented methods that can facilitate provision of steering feel haptic feedback and steering control, such as of a vehicle.

Figure 1A:
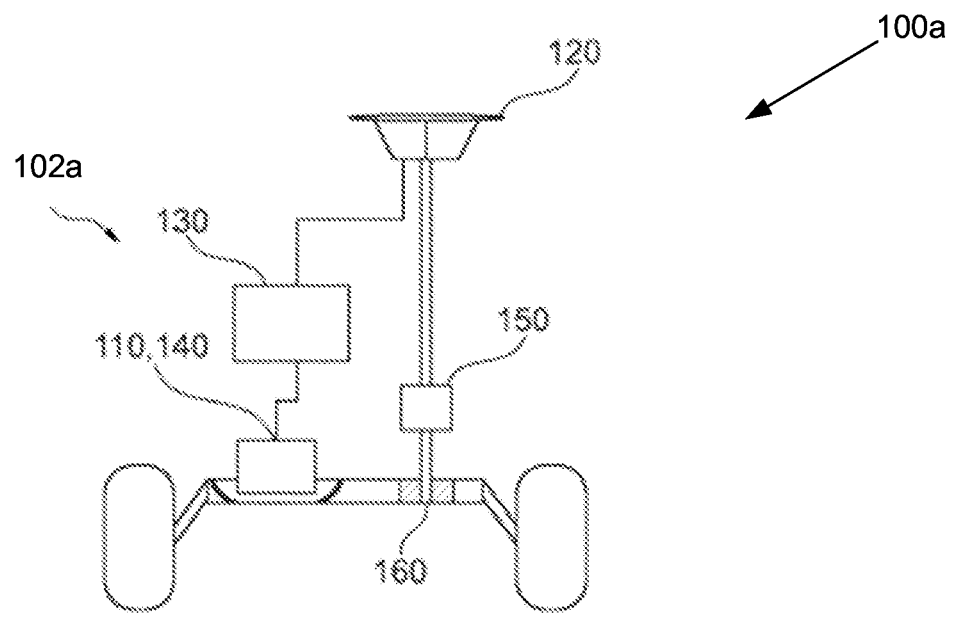
FIG. 1A illustrates a schematic diagram of a steering control system, in accordance with one or more embodiments described herein.
Figure 1B:
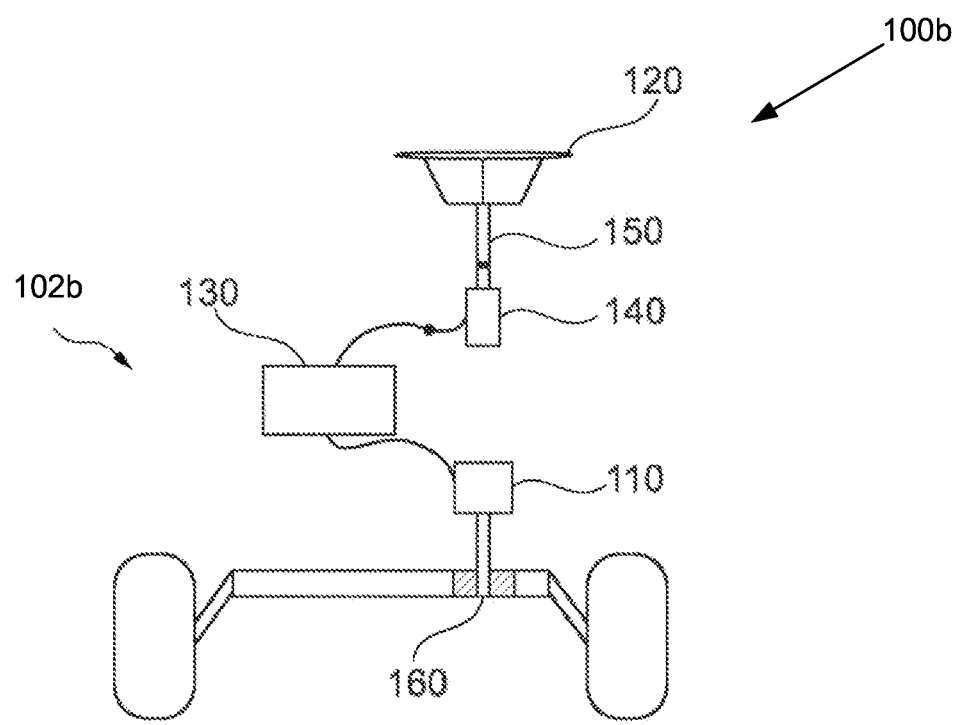
FIG. 1B illustrates another schematic diagram of a steering control system, in accordance with one or more embodiments described herein.

Looking first to FIGS. 1A and 1B, illustrated are a pair of steering control systems 100a and 100b.

At the steering control system 100a, an electric power assisted steering (EPAS) system 104 is provided. With EPAS, there can be only one servo motor to control the steering rack 160 and steering wheel 120, respectively. That is, an electronic control unit (ECU) can be coupled to the steering (e.g., at the steering wheel 120) and to the EPAS motor 110/140. Box 150 can represent a torsion bar and/or steering column.

At the steering control system 100b, a steer-by-wire (SbW) system is provided. In SbW there can be two servo motors, one each for the steering rack 160 and steering wheel 120, respectively. For controlling steering feedback in SbW, a force-feedback motor 140 can be coupled to the steering wheel 120. AN electronic control unit (ECU) 130 can control both of the force feedback motor 140 and the EPAS motor 110.

Figure 2:
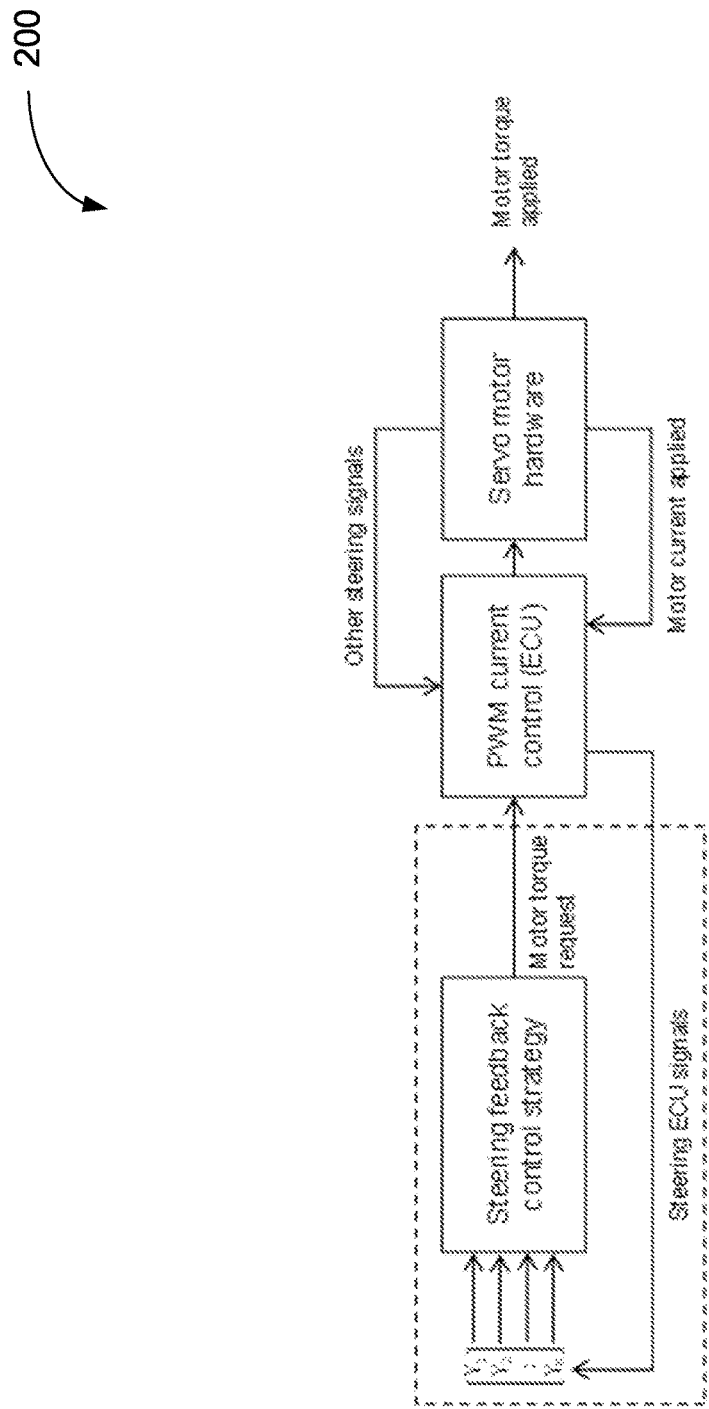
FIG. 2 illustrates a vehicle control system, in accordance with one or more embodiments described herein.

Turning next to FIG. 2, movement motors, such as the EPAS motors 110 or 110/140 can be controlled in either of FIG. 1A or 1B via a steering motor hardware and software (control) architecture 200. The architecture 200 can comprise a steering control system 202 that can provide a motor torque request to the ECU 130. The ECU 130 can provide a signal or control to servo motor hardware, such as the EPAS motors 110 (or 110/140), where requested motor torque can be applied. The architecture 200 can operate as a closed loop, where steering ECU signals from the ECU 130 can be employed by the steering control system 202. Likewise, steering signals and motor current applied by the servo motor hardware (e.g., EPAS motors 110 or 110/140) can be provided to the ECU 130. At FIG. 1B, rack movement at 160 can be constrained using the software (control) of the architecture 200, such as by requesting an equivalent pinion angle measured at the torsion bar 150 to the given control setting at the EPAS motor 110 of the system 102b.

Figure 3:
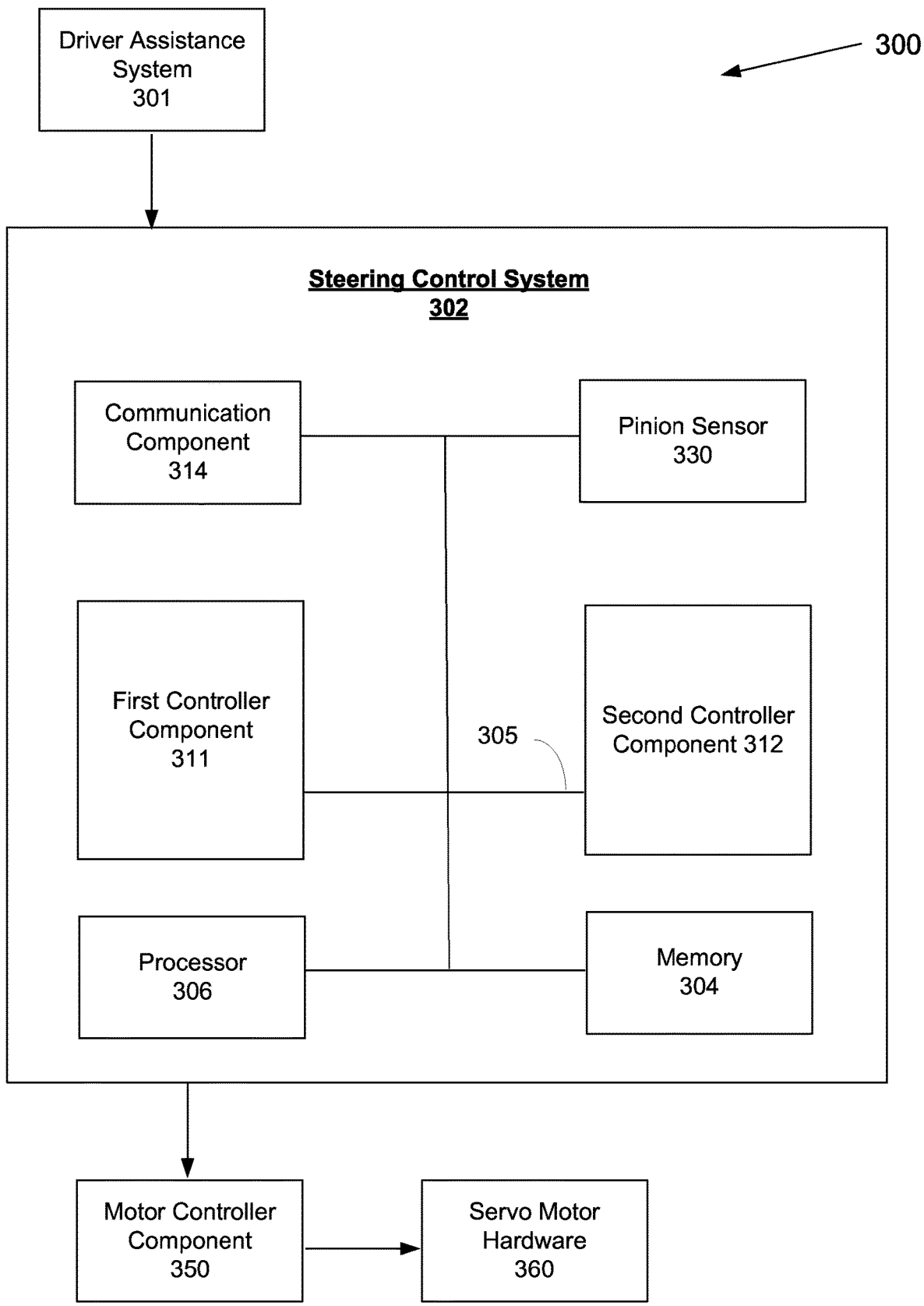
FIG. 3 illustrates a schematic diagram of a steering control system, in accordance with one or more embodiments described herein.

Turning now to FIG. 3, a schematic diagram of a vehicle control system 300 having a steering control system 302 is illustrated. The steering control system 302 can be used at the non-limiting systems 100a and/or 100b, such as to control and/or provide one or more requests and/or signals to the ECU, such as to provide a motor torque request. The steering control system 302 can be used at the architecture 200, such as in additional to or in place of the steering control system 202.

Generally, the steering control system 302 can operated in a closed-loop with the ECU, and employing information provided by a driver assistance system, such as an advanced driver assistance system (ADAS), to provide a non-conflicted and/or non-arbitrated motor torque request to the ECU, for controlling respective servo motor hardware, such as coupled to steering and/or rack and pinion of a moving system.

The illustrated vehicle control system 300 can comprise the steering control system 302, an advanced driver assistance system (ADAS) 301, a motor controller component 350 and servo motor hardware 360.

The ADAS 301 can be any suitable system that can interface with a user, and can employ one or more sensors, such as sensors 330, to automate, adapt and/or provide adaptive features, such as automated lighting, cruise control, collision avoidance assist, navigation warnings, obstacle warnings, lane departure assist, lane centering assist, mobile phone assist and/or the like. An angle request from ADAS 301 can comprise a steering column angle and/or a rack/pinion angle.

The servo motor hardware 360 can be an EPAS motor, a steering force feedback motor and/or a combination thereof (e.g., motors/actuators 110, 140 110/140 of FIGS. 1A and 1B). The servo motor hardware 360 can be controlled by a motor controller component 350, such as an ECU (e.g., ECU 130 of FIGS. 1A and 1B), based on a single motor torque request provided by the steering control system 302.

The steering control system 302 can comprise a processor 306, memory 304, bus 305, first controller component 311, second controller component 312, communication component 314 and/or one or more sensors, such as pinion sensors 330. Repetitive description of like elements employed in other embodiments described herein is omitted for sake of brevity.

In one or more embodiments, the steering control system 300 can be coupled (e.g., communicatively, electrically, operatively, optically, etc.) to one or more external systems, sources, and/or devices (e.g., classical and/or quantum computing devices, communication devices, etc.) via a network. The network can comprise one or more wired and/or wireless networks, including, but not limited to, a cellular network, a wide area network (WAN) (e.g., the Internet), and/or a local area network (LAN). For example, the steering control system 300 can communicate, such as via the controller/processor 306, with one or more external systems, sources, and/or devices, for instance, computing devices using the network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example and as described above, the steering control system 300 can thus include hardware (e.g., a central processing unit (CPU), a transceiver, a decoder, an antenna, quantum hardware, a quantum processor, etc.), software (e.g., a set of threads, a set of processes, software in execution, quantum pulse schedule, quantum circuit, quantum gates, etc.) or a combination of hardware and software that facilitates communicating information between the steering control system 300 and external systems, sources, and/or devices (e.g., computing devices, communication devices, etc.).

Processor 306 can comprise one or more types of processors and/or electronic circuitry (e.g., a classical processor, a quantum processor, etc.) that can implement one or more computer and/or machine readable, writable, and/or executable components and/or instructions that can be stored on memory. For example, the processor 306 can perform various operations that can be specified by such computer and/or machine readable, writable, and/or executable components and/or instructions including, but not limited to, logic, control, input/output (I/O), arithmetic, and/or the like. The processor 306 can comprise one or more central processing unit (CPU), multi-core processor, microprocessor, dual microprocessors, microcontroller, System on a Chip (SOC), array processor, vector processor, quantum processor, and/or another type of processor. Such examples of the processor can be employed to implement any embodiments described herein.

In an example embodiment, the processor 306 can comprise a central processing unit (CPU) such as, for example, a microprocessor. In some embodiments, processor 306 can comprise and/or employ one or more machine learning (ML) and/or artificial intelligence (AI) models to learn, for instance, one or more operating conditions and/or cause and effect conditions corresponding to the device and/or an external device coupled to the device. In these embodiments, based on learning such one or more operating conditions and/or cause and effect conditions, the processor 306 further can employ the one or more ML and/or AI models to perform one or more tasks including, but not limited to, making a prediction, making an estimation, classifying data, implementing one or more monitoring and/or control operations of the first controller component 311, second controller component 312, communication component 314 and/or another task. In one or more embodiments, the processor 306 can comprise one or more of the first controller component 311, second controller component 312, communication component 314 and/or pinion sensor 330.

The memory 304 can store one or more computer and/or machine readable, writable, and/or executable components and/or instructions that, when executed by the processor 306 (e.g., a classical processor, a quantum processor, etc.), can facilitate performance of operations defined by the executable component(s) and/or instruction(s). For example, the memory 304 can store computer and/or machine readable, writable, and/or executable components and/or instructions that, when executed by the processor, can facilitate execution of the various functions described herein relating to the first controller component 311, second controller component 312 and/or communication component 314. For instance, the memory 304 can store computer and/or machine readable, writable, and/or executable components and/or instructions that, when executed by the processor, can facilitate one or more of such tasks described above/below and/or to facilitate logging of monitoring data collected by one or more sensors, e.g., pinion sensors 330. In another example, memory 2304 can store computer and/or machine readable, writable, and/or executable components and/or instructions that, when executed by the processor, can facilitate operation of one or more switches to configure the device to operate in one or more operation modes described herein.

The memory 304 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Such examples of the memory 304 can be employed to implement any embodiments described herein.

Turning now to the other components of the steering control system 302, further operation of the closed-loop system 302 will be described in detail.

The steering control system 302 can interface ADAS 301 and a steering feedback (e.g., haptic) controller and/or steering control system 302. An ADAS request, such as an angle request or steering column angle request can be employed by a first controller component 311 to generate a request that is employed by a second controller component 312 to thereby generate a motor torque request, such as for the motor controller component 350. The ADAS request can thus be employed by a pair of controller components 311, 312 in sequence, to generate a single motor torque request from a single controller component (e.g., second controller component 312).

This is in comparison to existing technologies where sensed pinion torque and sensed pinion angle can be employed to generate steering feel function at a first controller component and to generate a first motor torque request. In such existing systems, an ADAS request can be employed by a second controller component, separate from any steering control, to generate a second, and often conflicting, motor torque request. Depending on prioritization, precedence and/or the like, the two motor torque requests (e.g., motor torque request signals) can be arbitrated, overlayed, summed and/or the like to generate a final motor torque request for use by an ECU. This final motor torque request can result in and/or be based on an unrealistic feedback, unrealistic steering feel and/or an unrealistic extended response time.

Differently, as indicated, the steering control system 302 can employ an ADAS angle request, along with at least one of a sensed pinion angle or sensed pinion torque at a first controller component 311, and regardless of the steering feel functionality, the result of which use can be employed by a second controller component 312 to generate a single motor torque request. The single motor torque request is generated by a single controller component (e.g., the second controller component 312). The single motor torque request is generated based on a single request from a single controller component (e.g., the first controller component 311). The single request, depending on the steering control system 302, can be a pinion request, such as a pinion torque request, or such as an effective pinion angle and speed request. Either such request can be employed as the single request to the second controller component 312 to generate the single motor torque request. In one or more embodiments, the sensed measurement and ADAS angle request likewise can be employed to generate steering feel functions and/or haptic control feedback, such as to a haptic controller (not shown).

That is, the single motor torque request can be generated absent conflict between two or more motor torque request signals. One signal taking precedence or prioritization over the other can be avoided, in view of only a single motor torque request from a single controller component being generated. Arbitration between a pair of motor torque request signals likewise can be avoided. Rather, a pair of controllers (e.g., the first controller component and the second controller component) are operated in series in a closed system, rather than the pair of controller components being operated at least partially in parallel to generate conflicting motor torque request signals. That is, the pair of controller components are operated at different non-overlapping time intervals, wherein one controller component operates based upon an output from the other controller component (e.g., the second controller component operates based on the single output request from the first controller component).

Transmission to the motor controller component 350 can be facilitated by the communication component 314. The transmission can be by any suitable method, such as radio frequency, Bluetooth, processor signal and/or the like. Because the single motor torque request is based on both pinion angle and pinion torque measurements, the single motor torque request can be described as comprising blended feedback data.

The steering control system 302 further can comprise one or more sensors, such as pinion sensors 330. Additionally and/or alternatively, the one or more pinion sensors 330 can be external to the steering control system 302 with data, measurements, information and/or the like being received, retrieved and/or otherwise obtained from the pinion sensors 330, such as by the first controller component 311, by the second controller component 312, by the processor 306 and/or by any suitable method, such as described elsewhere herein.

Figure 4:
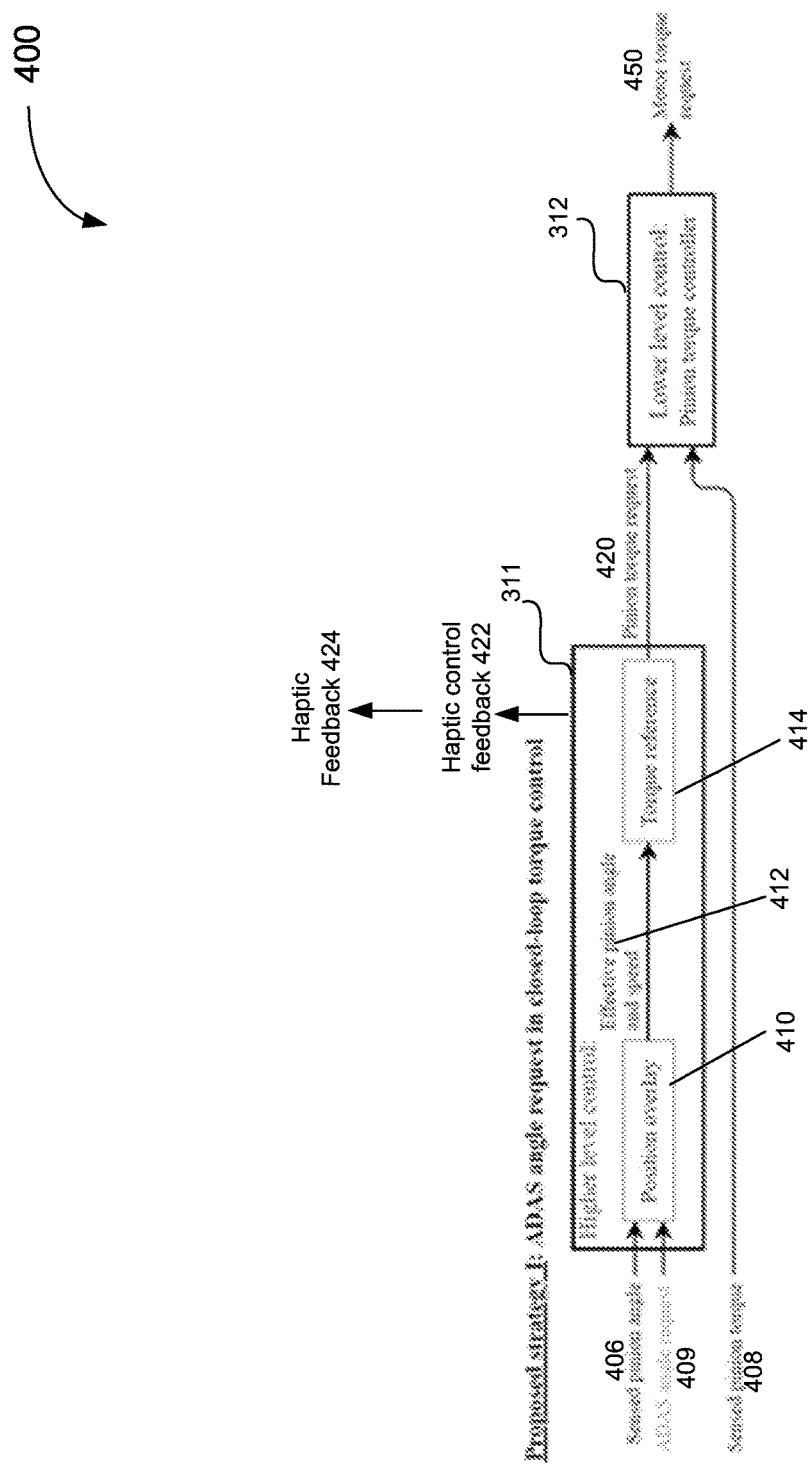
FIG. 4 illustrates a schematic flow diagram of a steering control method, in accordance with one or more embodiments described herein.
Figure 5:
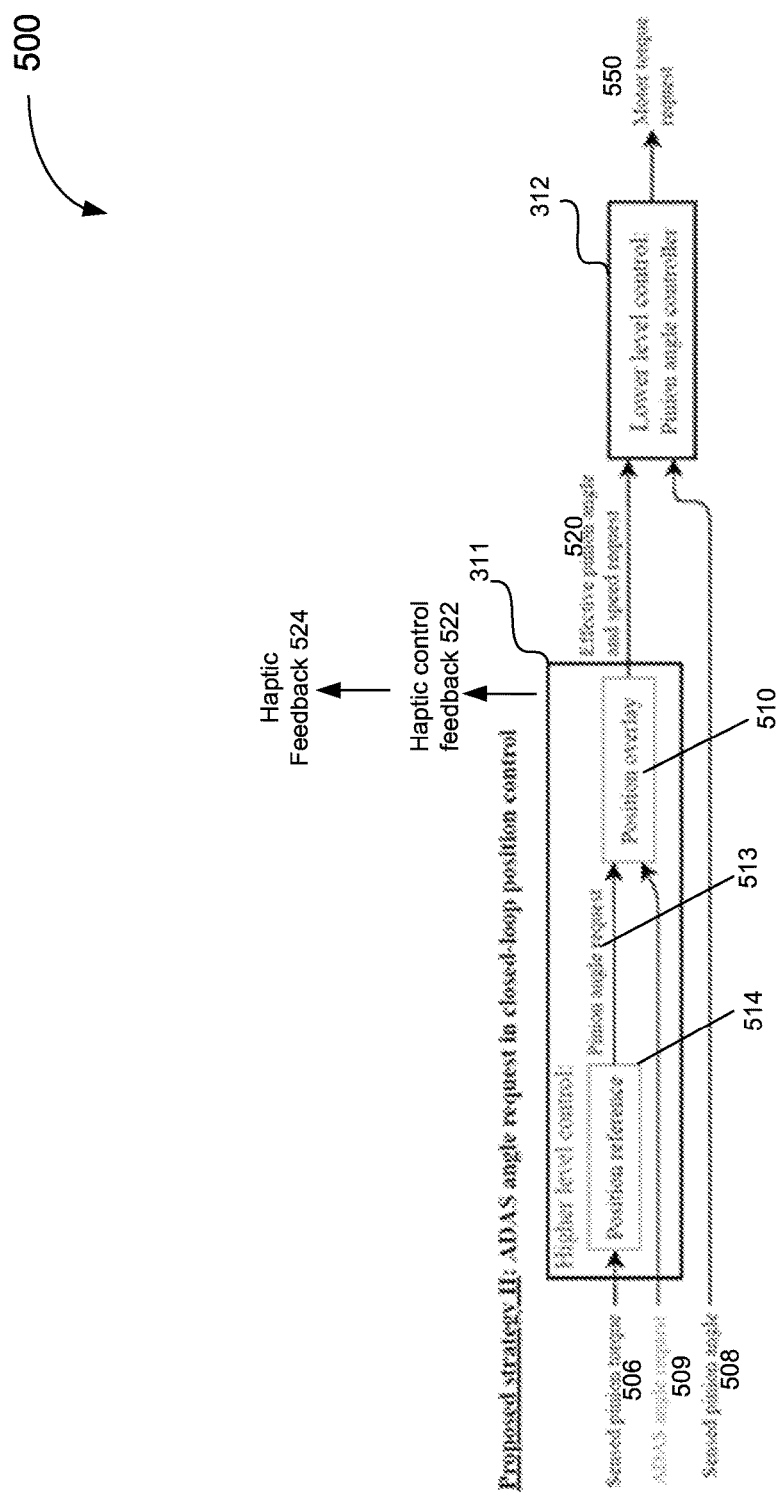
FIG. 5 illustrates a schematic flow diagram of another steering control method, in accordance with one or more embodiments described herein.

Turning now to FIGS. 4 and 5, a pair of methods are illustrated and described, which demonstrate alternative process flows for generating the single motor torque request.

Looking first to FIG. 4, illustrated is a block diagram of a closed-loop feedback control method 400 that can be applied to the above steering control system 302 and can be carried out by the processor 306, for example.

At FIG. 4, a position overlay arbitration 410 can be performed and torque reference function 414 can be generated, which together can output a pinion torque request 420 from the high level control (e.g., first controller component 311). The position overlay arbitration 410 can be based on at least a sensed pinion measurement, e.g., sensed pinion angle 406 and an ADAS angle request 4109. The position overlay arbitration 410 can output an effective pinion angle and speed 412 to be employed for the torque reference function 414.

The lower level control (e.g., second controller component 312) can employ the output from the higher level control and another sensed pinion measurement, e.g., sensed pinion torque 408, to provide a single motor torque request 450. That is, one of sensed pinion angle or pinion torque can be employed to generate a single output request 420, while the other of sensed pinion torque or sensed pinion angle can be employed to generate the motor torque request 450. At FIG. 5, the opposite will be applied, e.g., pinion torque swapped with pinion angle at the sensed measurements and single output request of the first controller component 311.

Additionally, a haptic control feedback 422 can be provided by the higher level control, such as for use in generating haptic feedback 424 for a user entity.

In the model-based higher level torque control, there are two functions: torque reference 414 and position overlay 410. The torque reference 414 can be based on the Newton's second law of motion. The input signals are pinion angle ($\theta_p$), pinion speed ($\omega_p = d\theta_p/dt$), and ADAS angle request ($\theta_{ext}$); the output signal is pinion torque reference/request ($M_{ref}$). The detailed layout is illustrated at FIG. 4. Based on the measured or estimated pinion motion state (i.e., in terms of angle, speed, and acceleration), reference torque can be computed and then the error can be minimized between the reference torque and the sensed torque ($M_p$) signals.

The position overlay function can be defined as follows, where $\theta_{eff}$ and $\omega_{eff}$ are the effective pinion angle and speed signals. The parameter 'ε' can control the amount of overlay/arbitration between the sensed angle and the requested angle from ADAS functions, such that $0 \le \varepsilon \le 1$. High ε can imply more precedence on ADAS, and low ε can imply more precedence on the steering feel functionality. This can be controlled as desired by the driver and the intervening ADAS function.

Position Overlay Equation(s):

$$\theta_{eff} = \theta_p - \varepsilon\theta_{ext}$$

$$\omega_{eff} = \frac{d\theta_{eff}}{dt} = \frac{d}{dt}(\theta_p - \varepsilon\theta_{ext}) = \omega_p - \varepsilon\omega_{ext}$$

The torque reference function can be defined as follows, where $J_{ref}$, $b_{ref}$, and $c_{ref}$ are reference inertia, damping, and stiffness parameters (non-negative), respectively. The pinion acceleration can be given by $\dot{\omega}_p = d\omega_p/dt$. This reference definition assumes no transparency, i.e., without any estimated rack force feedback for simplicity.

Torque Reference Equation(s):

$$M_{ref} = J_{ref}\dot{\omega}_p + b_{ref}\omega_{eff} + c_{ref}\theta_{eff}$$

$$= H_{ref}\dot{\omega}_p + b_{ref}(\omega_p - \varepsilon\omega_{ext}) + c_{ref}(\theta_p - \varepsilon\theta_{ext})$$

The torque controller definition can be defined as follows, which aims to minimize the error (e) between the reference and measured torque signals, i.e., given by $e = M_{ref} - M_p$. A simple example could be PI (proportional-integral) controller. In that case, the corresponding proportional and integral gains can be $\alpha_1 > 0$ and $\alpha_0 > 0$. However, other controls laws can also be implemented depending on the requirements.

Torque Controller Equation(s):

$$M_{mot,req} = f(e) = f(M_{ref} - M_p) = -(\alpha_1 e + \alpha_0 \int_0^t e \, d\tau)$$

The advantages of this position overlay approach can be that the approach is easy to tune, intuitive, and provides a model-based formulation. By altering E, it can be possible to determine how much intervention from ADAS functions need to be realized given the involvement of the driver entity for shared and/or full steering control.

At FIG. 5, a position overlay arbitration 510 can be performed and position reference function 514 can be generated, although in opposite sequence as compared to FIG. 4. The position overlay arbitration 510 and position reference function 514 together can output an effective pinion angle and speed request 520 from the high level control (e.g., first controller component 311). The position reference function 514 can be at least based on a sensed pinion measurement, e.g., sensed pinion torque 506. The position overlay arbitration 510 can be based on at least a pinion angle request 513 output from the position reference function 514 and an ADAS angle request 509. The position overlay arbitration 510 can output an effective pinion angle and speed request 520 to be employed by the lower level control.

The lower level control (e.g., second controller component 312) can employ the output from the higher level control and another sensed pinion measurement, e.g., sensed pinion angle 508, to provide a single motor torque request 550. That is, one of sensed pinion angle or pinion torque can be employed to generate a single output request 520, while the other of sensed pinion torque or sensed pinion angle can be employed to generate the motor torque request 550.

Additionally, a haptic control feedback 522 can be provided by the higher level control, such as for use in generating haptic feedback 524 for a user entity.

In the model-based higher level position control, position reference 514 and position overlay 510 functions can be inverted due to their causality. The position reference 514 is again based on the Newton's second law of motion. The input signals are sensed pinion torque ($M_p$) and ADAS angle request ($\theta_{ext}$); the output signals are effective pinion angle and speed reference or request ($\theta_{eff,ref}$ and $\omega_{eff,ref}$), respectively. The detailed layout is shown below in FIG. 5. Based on the measured pinion torque, reference angle and speed can be computed and then the error can be minimized between the reference and sensed pinion states (i.e., in terms of angle, speed, and acceleration).

The position reference function can be defined as follows, where $J_{ref}$, $b_{ref}$, and $c_{ref}$ are reference inertia, damping, and stiffness parameters, respectively. The reference pinion acceleration can be given by $\dot{\omega}_{ref} = d\omega_{ref}/dt$. This reference definition also assumes no transparency, i.e., without any estimated rack force feedback for simplicity.

Position Reference Equation(s):

$$\dot{\omega}_{ref} = \frac{1}{J_{ref}}(-b_{ref}\omega_{ref} - c_{ref}\theta_{ref} + M_p)$$

The position overlay function can be defined as follows, where $\theta_{eff,ref}$ and $\omega_{eff,ref}$ are the effective pinion angle and speed reference/request signals. Again, the parameter 'E' can control the amount of overlay/arbitration between the reference angle and the requested angle from ADAS functions, such that $0 \leq \varepsilon \leq 1$. High $\varepsilon$ can imply for more precedence on ADAS, and low $\varepsilon$ can imply more precedence on the steering feel functionality that can be controlled as desired.

Position Overlay Equation(s):

$$\theta_{eff,ref} = \theta_{ref} + \varepsilon\theta_{ext}$$

$$\omega_{eff,ref} = \frac{d\theta_{eff,ref}}{dt} = \frac{d}{dt}(\theta_{ref} + \varepsilon\theta_{ext}) = \omega_{ref} + \varepsilon\omega_{ext}$$

The position controller definition can be defined as follows, which aims to minimize the error states (e, ė), defined as the difference between the reference and measured angle and speed variables, given by $e=\theta_{eff,ref}-\theta_p$ and $\dot{e}=\omega_{eff,ref}-\omega_p$, respectively. A simple example could be a model-based controller. In such case, the corresponding controller gains for error in acceleration, speed, angle, and its integral state are $\beta_3>0$, $\beta_2>0$, $\beta_1>0$, and $\beta_0>0$, respectively.

Position Controller Equation(s):

$$M_{mot,req} = f(e, \dot{e}) = f(\theta_{eff,ref} - \theta_p, \omega_{eff,ref} - \omega_p) = \beta_3\frac{d\dot{e}}{dt} + \beta_2\dot{e} + \beta_1 e + \beta_0\int_0^t e\, d\tau$$

The above formulation in position control can be mathematically equivalent to torque control, however, the causality can be inverted due to its model-based reference definition. Ideally, both closed-loop solutions can perform in a similar manner, given that they have similar lower lever controller tracking performance.

Figure 6:
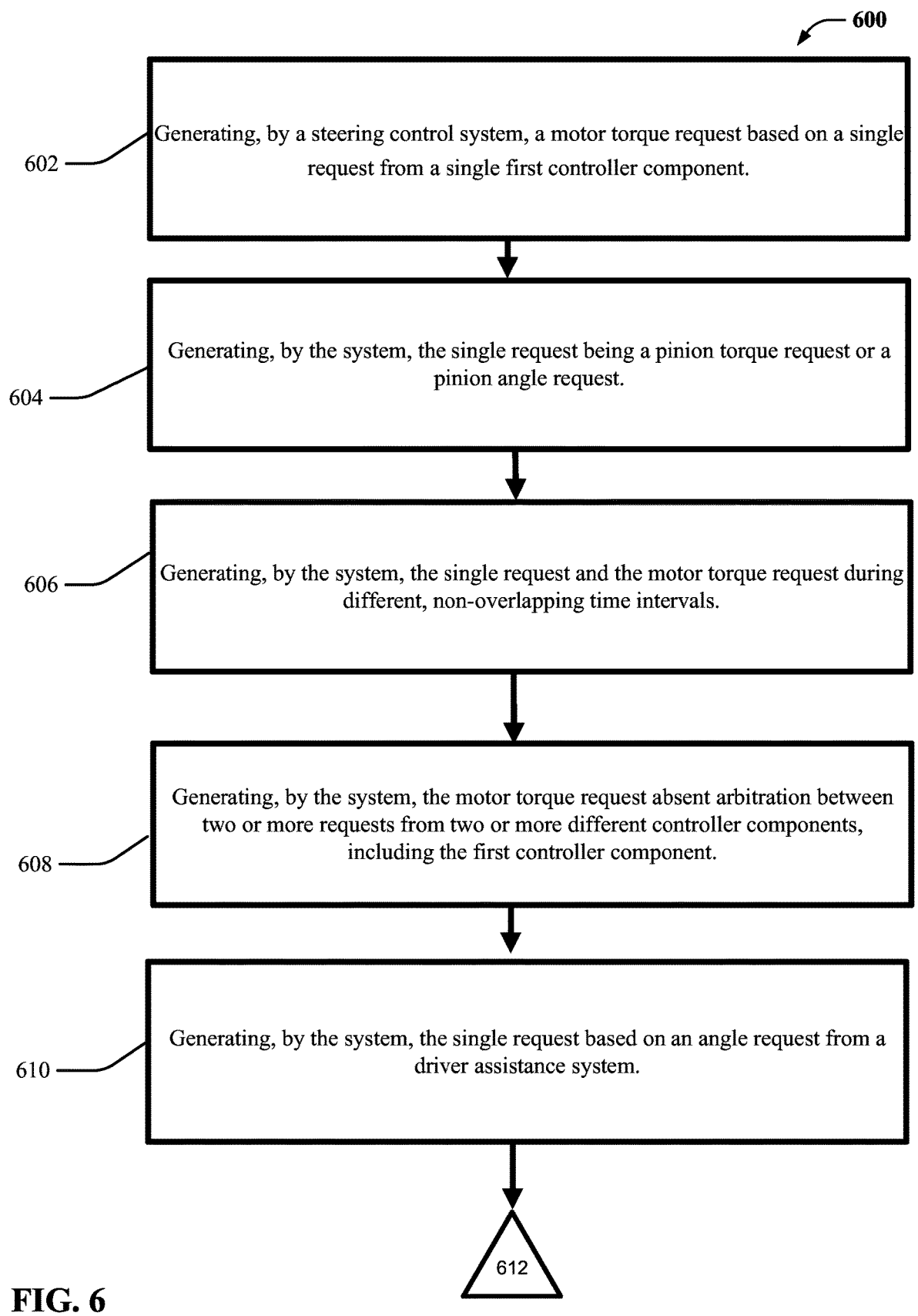
FIG. 6 illustrates a flow diagram of an example, non-limiting system-implemented method that can facilitate steering feel feedback and steering control, in accordance with one or more embodiments described herein.

Turning now to FIG. 6, illustrated is a flow diagram of an example, non-limiting system-implemented and/or computer-implemented method 600 that can facilitate haptic feedback output and steering control output, in accordance with one or more embodiments described herein. Repetitive description of like elements employed in other embodiments described herein is omitted for sake of brevity.

At 602, the system- and/or computer-implemented method 600 can comprise generating, by a steering control system, a motor torque request based on a single request from a single first controller component.

At 604, the system- and/or computer-implemented method 600 can comprise generating, by the system, the single request being a pinion torque request or a pinion angle request.

At 606, the system- and/or computer-implemented method 600 can comprise generating, by the system, the single request and the motor torque request during different, non-overlapping time intervals.

At 608, the system- and/or computer-implemented method 600 can comprise generating, by the system, the motor torque request absent arbitration between two or more requests from two or more different controller components, including the first controller component.

At 610, the system- and/or computer-implemented method 600 can comprise generating, by the system, the single request based on an angle request from a driver assistance system.

Figure 7:
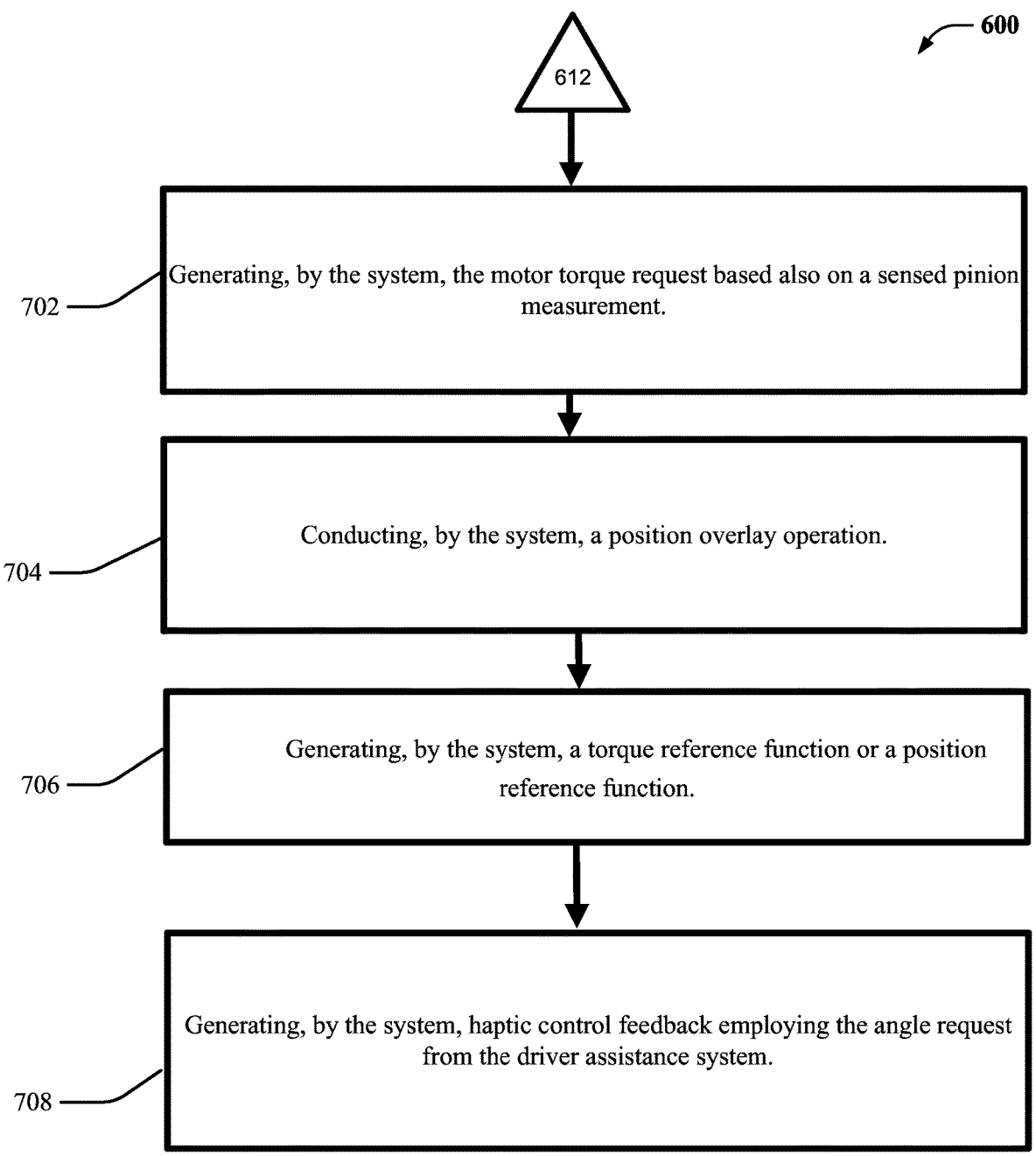
FIG. 7 illustrates a continuation of the flow diagram of FIG. 6 of an example, non-limiting system-implemented method that can facilitate steering feel feedback and steering control, in accordance with one or more embodiments described herein.

Turning now to FIG. 7, the system-implemented method 600 is continued at the continuation triangle 612.

At 702, the system- and/or computer-implemented method 600 can comprise generating, by the system, the motor torque request based also on a sensed pinion measurement.

At 704, the system- and/or computer-implemented method 600 can comprise conducting, by the system, a position overlay operation.

At 706, the system- and/or computer-implemented method 600 can comprise generating, by the system, a torque reference function or a position reference function.

At 708, the system- and/or computer-implemented method 600 can comprise generating, by the system, haptic control feedback employing the angle request from the driver assistance system.

Turning now to any of the one or more embodiments discussed above with reference to any one or more of FIGS. 1 to 7, in view of the aforementioned descriptions, the one or more embodiments described herein are summarized.

In summary, one or more embodiments described herein, devices, systems, methods and/or apparatuses are described that can facilitate provision of a single motor torque request based on a driver assistance system pinion angle request. The motor torque request can be generated absent arbitration between two or more requests from two or more different controller components. A device can comprise a steering control system 302 that generates a motor torque request based on a single request from a single first controller component 311.

An advantage of the one or more devices, systems and/or methods can be generation of a motor torque request absent conflict between two or more motor torque request signals. One signal taking precedence or prioritization over the other can be avoided, in view of only a single motor torque request from a single controller component being generated. Arbitration between a pair of motor torque request signals also can be avoided. Rather, a pair of controllers (e.g., first controller component and second controller component) are operated in series in a closed system, rather than the pair of controller components being operated at least partially in parallel to generate conflicting motor torque request signals. That is, the pair of controller components are operated at different non-overlapping time intervals, wherein one controller component operates based upon an output from the other controller component.

The one or more flowcharts and/or block diagrams in the Figures illustrate the architecture, functionality, and operation of one or more possible implementations of one or more systems, apparatuses and/or methods according to various embodiments described herein. In this regard, one or more blocks in the one or more flowcharts and/or block diagrams can represent a module, segment and/or portion of instructions, which can comprise one or more executable instructions for implementing the specified logical function(s). In one or more alternative implementations, one or more functions noted in one or more of the blocks can occur out of the order illustrated in the Figures. For example, one or more blocks shown in succession can be executed substantially concurrently and/or the one or more blocks can be executed in a reverse order as that illustrated, such as depending upon a functionality involved. It also will be noted that one or more blocks of the one or more flowcharts and/or block diagrams, and/or one or more combinations of one or more blocks thereof, can be implemented by a special purpose hardware-based system that can perform one or more of the specified functions and/or can carry out one or more special purpose hardware and/or computer instructions.

As indicated, one or more aspects are described herein with reference to one or more flowchart illustrations and/or block diagrams of one or more methods, apparatuses and/or systems according to one or more embodiments described herein. It will be understood that one or more blocks of the one or more flowcharts and/or block diagrams, and/or one or more combinations of blocks in the one or more flowcharts and/or block diagrams, can be implemented by one or more computer-readable program instructions.

The computer-readable program instructions can be provided to a processor of a general purpose computer, special purpose computer and/or other programmable data processing apparatus to produce a machine. For example, the instructions, which can execute via the processor of the computer and/or other programmable data-processing apparatus, can create one or more means for implementing the one or more functions and/or processes specified in the one or more flowchart and/or block diagram blocks. The computer-readable program instructions can be stored in a computer-readable storage medium that can direct a computer, programmable data processing apparatus and/or other device to function in a particular manner. For example, the computer-readable storage medium having instructions stored therein can comprise an article of manufacture including instructions that can implement one or more aspects of the one or more functions and/or processes specified in the one or more flowchart and/or block diagram blocks. The computer-readable program instructions can be loaded onto a computer, other programmable data processing apparatus and/or other device to cause one or more operational acts to be performed on the computer, other programmable apparatus and/or other device to produce a computer-implemented process. For example, the instructions that can execute on the computer, other programmable apparatus and/or other device can implement the one or more functions and/or processes specified in the one or more flowchart and/or block diagram blocks.

Figure 8:
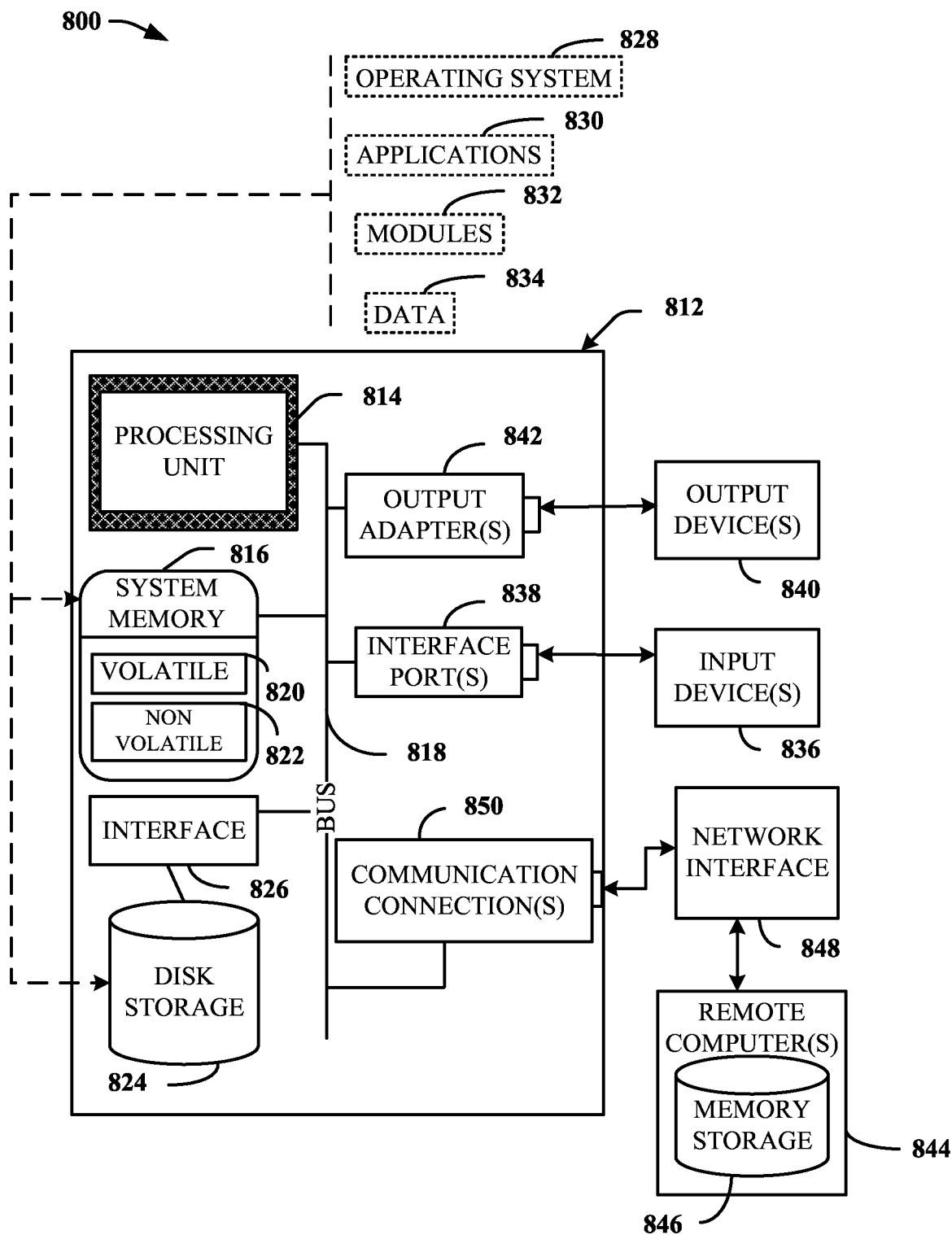
FIG. 8 illustrates a block diagram of an example, non-limiting operating environment, in which one or more embodiments described herein can be facilitated.

Next, in order to provide a context for the various aspects of the disclosed subject matter, FIG. 8 as well as the following discussion are intended to provide a general description of a suitable environment in which the various aspects of the disclosed subject matter can be implemented. FIG. 8 illustrates a suitable operating environment 800 for implementing various aspects described herein, which suitable operating environment 800 can include a computer 812. The computer 812 can also include a processing unit 814, a system memory 816 and a system bus 818. The system bus 818 can couple system components including, but not limited to, the system memory 816 to the processing unit 814. The processing unit 814 can be any of various available processors. Dual microprocessors and other multiprocessor architectures also can be employed as the processing unit 814. The system bus 818 can be any one or more types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1074), and Small Computer Systems Interface (SCSI). The system memory 816 can also include volatile memory 820 and/or nonvolatile memory 822. The basic input/output system (BIOS), containing the basic routines to transfer information between elements within the computer 812, such as during start-up, can be stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 820 can also include random access memory (RAM), which acts as external cache memory. By way of illustration and not limitation, RAM can be available in one or more forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM.

Computer 812 can also include removable/non-removable, volatile/non-volatile computer storage media. FIG. 8 illustrates, for example, a disk storage 824. Disk storage 824 can include, but is not limited to, devices like a magnetic disk drive, floppy disk drive, tape drive, Jaz drive, Zip drive, LS-100 drive, flash memory card and/or memory stick. The disk storage 824 can include storage media separately and/or in combination with other storage media including, but not limited to, an optical disk drive such as a compact disk ROM device (CD-ROM), CD recordable drive (CD-R Drive), CD rewritable drive (CD-RW Drive) and/or a digital versatile disk ROM drive (DVD-ROM). To facilitate connection of the disk storage 824 to the system bus 818, a removable or non-removable interface is typically used, such as interface 826.

FIG. 8 also depicts software that can act as an intermediary between users and the basic computer resources described in the suitable operating environment 800. Such software can include, for example, an operating system 828. Operating system 828, which can be stored on disk storage 824, can act to control and allocate resources of the computer 812. System applications 830 can take advantage of the management of resources by operating system 828 through program modules 832 and/or program data 834, e.g., stored in system memory 816 and/or on disk storage 824. One or more embodiments described herein can be implemented with various operating systems and/or combinations of operating systems.

A user can enter commands or information into the computer 812 through input device(s) 836. Input devices 836 can include, but are not limited to, a pointing device such as a mouse, trackball, stylus, touch pad, keyboard, microphone, joystick, game pad, satellite dish, scanner, TV tuner card, digital camera, digital video camera, web camera and/or the like. These and/or other input devices can connect to the processing unit 814 through the system bus 818 via interface port(s) 838. Interface port(s) 838 can include, for example, a serial port, a parallel port, a game port and/or a universal serial bus (USB). Output device(s) 840 can use one or more of the same type of ports as input device(s) 836. For example, a USB port can be used to provide input to computer 812 and/or to output information from computer 812 to an output device 840. Output adapter 842 can be provided to illustrate that there are one or more output devices 840 like monitors, speakers and/or printers, among other output devices 840, which can require special adapters. The output adapters 842 can include, by way of illustration and not limitation, video and/or sound cards that can provide a means of connection between the output device 840 and the system bus 818. It can be noted that other devices and/or systems of devices can provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor-based appliance, a peer device and/or other common network node and/or the like, and/or typically can also include many of the elements described relative to computer 812. For purposes of brevity, only a memory storage device 846 is illustrated with remote computer(s) 844. Remote computer(s) 844 can be logically connected to computer 812 through a network interface 848 and then physically connected via communication connection 850. Network interface 848 encompasses wired and/or wireless communication networks such as local-area networks (LAN), wide-area networks (WAN), cellular networks and/or the like. LAN technologies include Fiber Distributed Data Interface (FDDI), Copper Distributed Data Interface (CDDI), Ethernet, Token Ring and/or the like. WAN technologies can include, but are not limited to, point-to-point links, circuit switching networks like Integrated Services Digital Networks (ISDN) and/or variations thereon, packet switching networks and/or Digital Subscriber Lines (DSL). Communication connection(s) 850 refers to the hardware/software that can be employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and/or external technologies such as, modems including regular telephone grade modems, cable modems and DSL modems, ISDN adapters and/or Ethernet cards.

Figure 9:
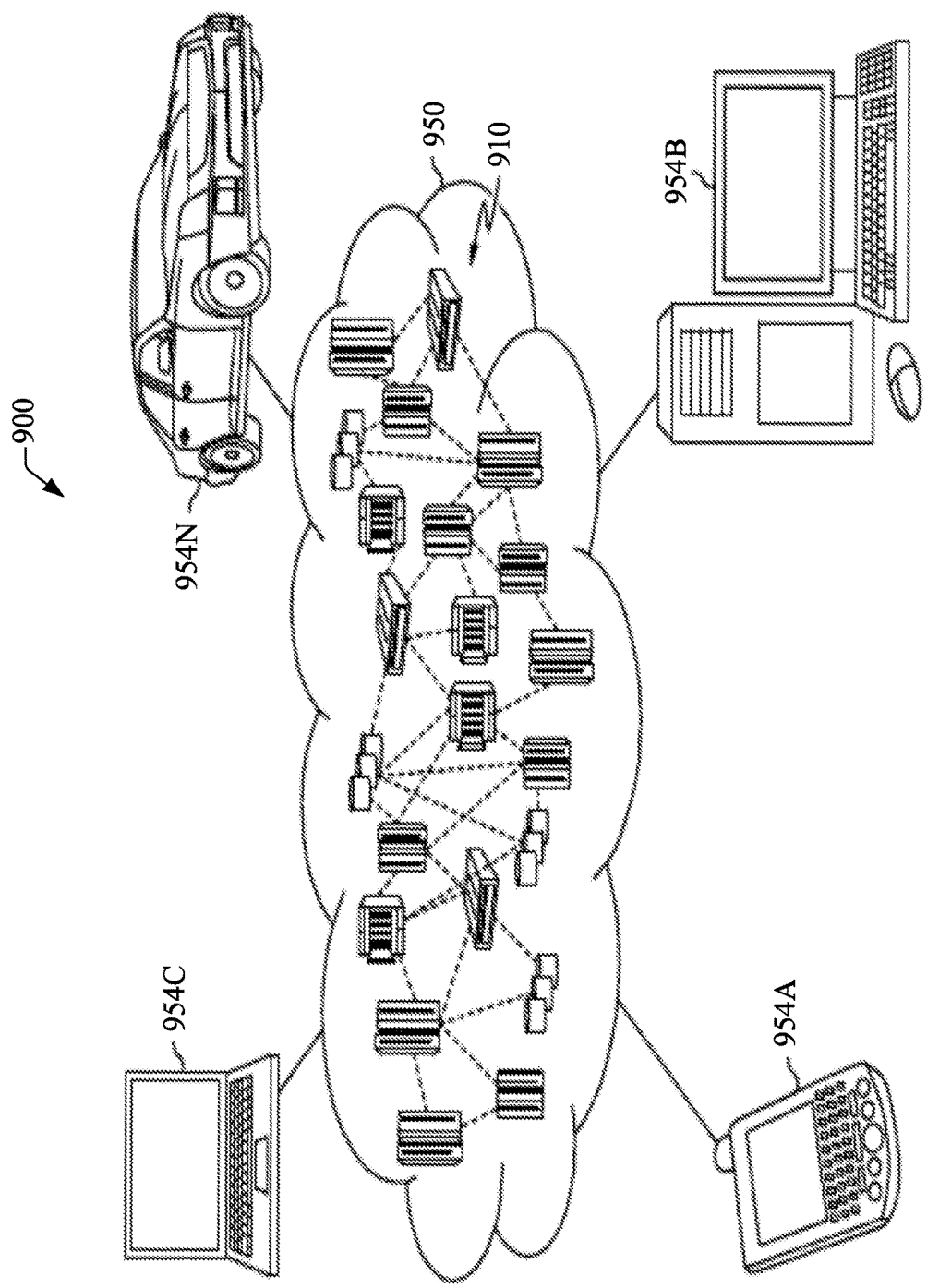
FIG. 9 illustrates a block diagram of an example, non-limiting cloud computing environment, in accordance with one or more embodiments described herein.
Figure 10:
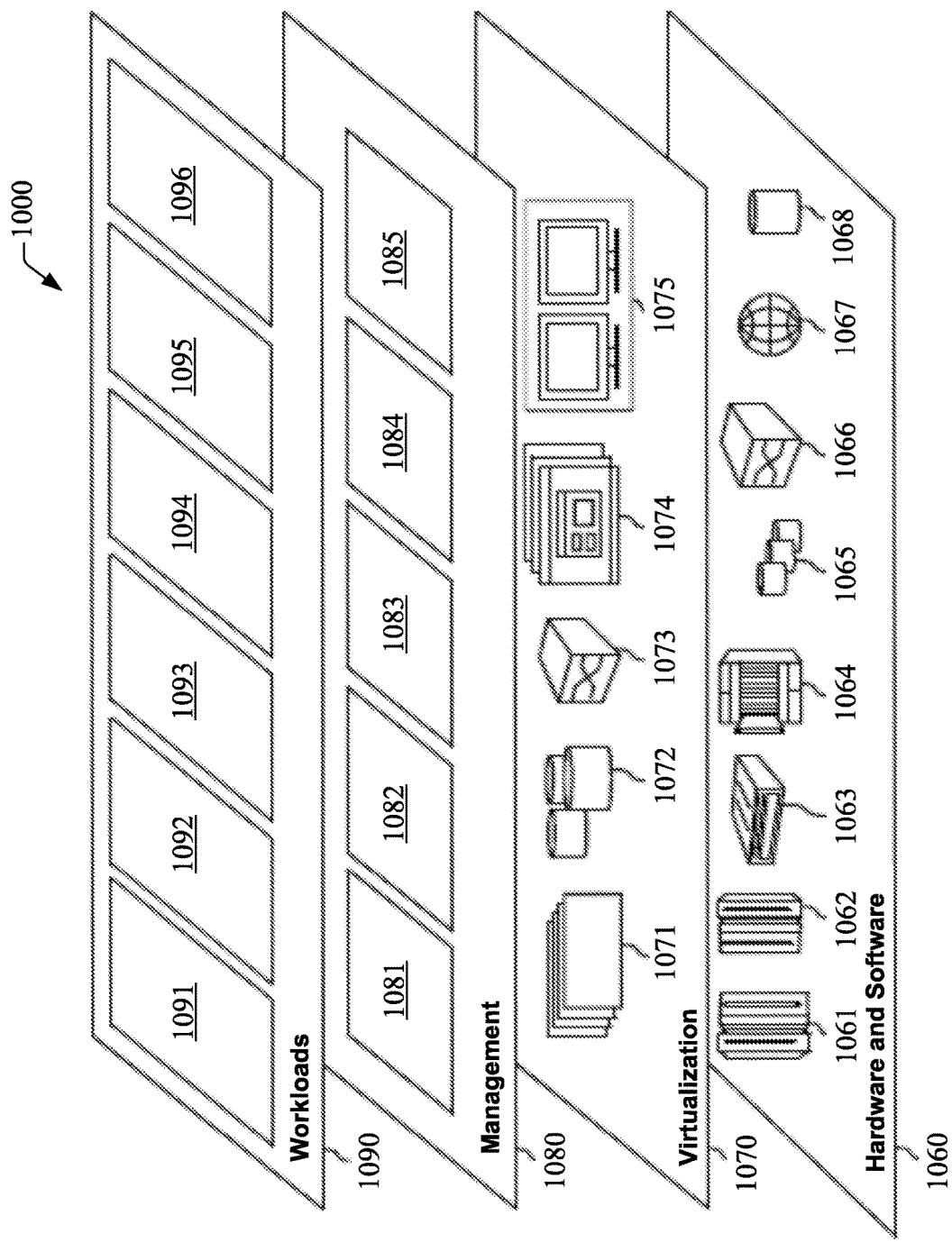
FIG. 10 illustrates a block diagram of a plurality of example, non-limiting abstraction model layers, in accordance with one or more embodiments described herein.

In one or more cases, the various embodiments of the non-limiting systems 100a, 100b 200 and/or 300 described herein can be associated with a cloud computing environment, such as a cloud computing environment 950 as is illustrated in FIG. 9 and/or with one or more functional abstraction layers described herein with reference to FIG. 10 (e.g., hardware and software layer 1060, virtualization layer 1070, management layer 1080 and/or workloads layer 1090).

It is to be understood that although a detailed description is provided herein on cloud computing, implementation of the teachings recited herein are not limited to a cloud computing environment. Rather, one or more embodiments described herein can be capable of being implemented in conjunction with any other type of computing environment now known or later developed.

Regarding cloud computing, cloud computing can be a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and/or at least four deployment models.

Characteristics can be as follows:

On-demand self-service: a cloud consumer can unilaterally provision computing capabilities, such as server time and network storage, as needed automatically without requiring human interaction with the service's provider.

Broad network access: capabilities can be available over a network and accessed through standard mechanisms that promote use by heterogeneous thin or thick client platforms (e.g., mobile phones, laptops, and PDAs).

Resource pooling: the provider's computing resources can be pooled to serve multiple consumers using a multi-tenant model, with different physical and virtual resources dynamically assigned and reassigned according to demand. There can be a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems can automatically control and/or optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models can be as follows:

Software as a Service (SaaS): the capability provided to the consumer can be to use the provider's applications running on a cloud infrastructure. The applications can be accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer can be to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer can be to provision processing, storage, networks, and other fundamental computing resources where the consumer can deploy and run arbitrary software, which can include operating systems and applications. The consumer does not manage or control the underlying cloud infrastructure but can have control over operating systems, storage, deployed applications, and/or possibly limited control of select networking components (e.g., host firewalls).

Deployment Models can be as follows:

Private cloud: the cloud infrastructure can be operated solely for an organization. It can be managed by the organization and/or a third party and can exist on-premises and/or off-premises.

Community cloud: the cloud infrastructure can be shared by one or more organizations and can support a specific community that can have shared concerns (e.g., mission, security requirements, policy, and compliance considerations). The cloud infrastructure can be managed by the organizations and/or by a third party and/or can exist on-premises and/or off-premises.

Public cloud: the cloud infrastructure can be made available to the general public and/or to a large industry group and/or can be owned by an organization selling cloud services.

Hybrid cloud: the cloud infrastructure can be a composition of two or more clouds (private, community and/or public) that can remain as unique entities but can be bound together by standardized and/or proprietary technology that enables data and application portability (e.g., cloud bursting for load-balancing between clouds).

A cloud computing environment can be service oriented with a focus on statelessness, low coupling, modularity and/or semantic interoperability. At the heart of cloud computing can be an infrastructure that can include a network of interconnected nodes.

Referring now specifically to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C and/or automobile computer system 954N can communicate. Although not illustrated in FIG. 9, cloud computing nodes 910 can further comprise a quantum platform (e.g., quantum computer, quantum hardware, quantum software and/or another quantum platform) with which local computing devices used by cloud consumers can communicate. Nodes 910 can communicate with one another. Nodes 910 can be grouped (not shown) physically and/or virtually, in one or more networks, such as Private, Community, Public and/or Hybrid clouds as described hereinabove, and/or a combination thereof. This grouping can allow cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and/or cloud computing environment 950 can communicate with any type of computerized device over any type of network and/or network addressable connection (e.g., using a web browser).

Referring next specifically to FIG. 10, a set of functional abstraction layers provided by cloud computing environment 950 (FIG. 9) is shown. It should be understood in advance that the components, layers and/or functions shown in FIG. 10 are intended to be illustrative only and that the one or more embodiments described herein are not limited thereto. As depicted, the following layers and/or corresponding functions are provided:

Hardware and software layer 1060 can include hardware and software components. Examples of hardware components can include: mainframes 1061; RISC (Reduced Instruction Set Computer) architecture based servers 1062; servers 1063; blade servers 1064; storage devices 1065; and/or networks and networking components 1066. In one or more embodiments, software components can include network application server software 1067, database software 1068, quantum platform routing software (not illustrated in FIG. 10), and/or quantum software (not illustrated in FIG. 10).

Virtualization layer 1070 can provide an abstraction layer from which the following examples of virtual entities can be provided: virtual servers 1071; virtual storage 1072; virtual networks 1073, including virtual private networks; virtual applications and operating systems 1074; and/or virtual clients 1075.

In one example, management layer 1080 can provide the functions described below. Resource provisioning 1081 can provide dynamic procurement of computing resources and/or other resources that can be utilized to perform tasks within the cloud computing environment. Metering and pricing 1082 can provide cost tracking as resources are utilized within the cloud computing environment, and/or billing and/or invoicing for consumption of these resources. In one example, these resources can include application software licenses. Security can provide identity verification for cloud consumers and tasks, as well as protection for data and other resources. User portal 1083 can provide access to the cloud computing environment for consumers and system administrators. Service level management 1084 can provide cloud computing resource allocation and management such that required service levels are met. Service Level Agreement (SLA) planning and fulfillment 1085 can pre-arrangement for, and procurement of, cloud computing resources for which a future requirement is anticipated in accordance with an SLA.

Workloads layer 1090 can provide one or more examples of functionality for which the cloud computing environment 950 (FIG. 9) can be utilized. Non-limiting examples of workloads and/or functions which can be provided from this layer can include: mapping and navigation 1091; software development and lifecycle management 1092; virtual classroom education delivery 1093; data analytics processing 1094; transaction processing 1095; and/or vulnerability risk assessment software 1096.

The one or more embodiments described herein can include on or more of a system, a method, an apparatus and/or a computer program product at any possible technical detail level of integration. The computer program product can include a computer readable storage medium (or media) having computer readable program instructions thereon for causing a processor to carry out one or more aspects of the one or more embodiment described herein. The computer readable storage medium can be a tangible device that can retain and/or store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more particular examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card and/or network interface in one or more computing/processing devices can receive computer readable program instructions from the network and/or forward the computer readable program instructions for storage in a computer readable storage medium within the respective computing/processing device.

Computer readable program instructions for carrying out one or more operations of the one or more embodiments described herein can be assembler instructions, instruction-set-architecture (ISA) instructions, machine instructions, machine dependent instructions, microcode, firmware instructions, state-setting data, configuration data for integrated circuitry, and/or either source code or object code written in any combination of one or more programming languages, including an object oriented programming language such as Smalltalk, C++, or the like, and/or procedural programming languages, such as the "C" programming language and/or similar programming languages. The computer readable program instructions can execute entirely on the user's computer, partly on the user's computer, as a stand-alone software package, partly on the user's computer and partly on a remote computer and/or entirely on the remote computer and/or server. In the latter scenario, the remote computer can be connected to the user's computer through any type of network, including a local area network (LAN) and/or a wide area network (WAN), and/or the connection can be made to an external computer (for example, through the Internet using an Internet Service Provider). In one or more embodiments, electronic circuitry including, for example, one or more programmable logic circuitry, field-programmable gate arrays (FPGA) and/or programmable logic arrays (PLA) can execute the computer readable program instructions by utilizing state information of the computer readable program instructions to personalize the electronic circuitry, in order to perform one or more aspects of the one or more embodiments described herein.

Those skilled in the art will recognize that one or more embodiments described herein can or can be implemented in combination with one or more program modules. Generally, program modules can include routines, programs, components and/or data structures that can perform particular tasks and/or implement particular abstract data types. Moreover, the computer-implemented and/or system-implemented methods described herein can be practiced with other computer system configurations, including single-processor and/or multiprocessor computer systems, mini-computing devices, and/or mainframe computers, as well as computers, hand-held computing devices (e.g., PDA, phone), microprocessor-based and/or programmable consumer and/or industrial electronics, and/or the like.

The illustrated aspects can also be practiced in one or more distributed computing environments in which tasks can be performed by remote processing devices that are linked through a communications network. However, one or more, if not all aspects described herein can be practiced on one or more stand-alone computers.

In a distributed computing environment, program modules can be located in both local and remote memory storage devices. For example, in one or more embodiments, computer executable components can be executed from memory that can include and/or be comprised of one or more distributed memory units. As used herein, the term "memory" and "memory unit" are interchangeable. Further, one or more embodiments described herein can execute code of the computer executable components in a distributed manner, e.g., multiple processors combining and/or working cooperatively to execute code from one or more distributed memory units. As used herein, the term "memory" can encompass a single memory and/or memory unit at one location and/or multiple memories and/or memory units at one or more locations.

As used herein, the terms "component," "system," "platform," "interface," and the like, can refer to and/or can include a computer-related entity and/or an entity related to an operational machine with one or more specific functionalities. One or more such entities disclosed herein can be hardware, a combination of hardware and software, software, and/or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric and/or electronic circuitry, which can be operated by a software and/or firmware application executed by a processor. In such a case, the processor can be internal and/or external to the apparatus and/or can execute at least a part of the software and/or firmware application. As yet another example, a component can be an apparatus that provides specific functionality through electronic components without mechanical parts, wherein the electronic components can include a processor and/or other means to execute software and/or firmware that confers at least in part the functionality of the electronic components. In an aspect, a component can emulate an electronic component via a virtual machine, e.g., within a cloud computing system.

As used herein, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a graphics processing unit (GPU), a field programmable gate array (FPGA), a programmable logic controller (PLC), a complex programmable logic device (CPLD), a discrete gate or transistor logic, discrete hardware components, and/or any combination thereof designed to perform the functions described herein. Further, one or more processors can exploit nano-scale architectures such as, but not limited to, molecular and/or quantum-dot based transistors, switches and/or gates, in order to optimize space usage and/or to enhance performance of user equipment. A processor can also be implemented as a combination of computing processing units.

As used herein, terms such as "store," "storage," "data store," "data storage," "database," and substantially any other information storage component relevant to operation and/or functionality of a component are utilized to refer to "memory components," entities embodied in a "memory," and/or components comprising a memory. Memory and/or memory components described herein can be volatile memory and/or nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in one or more forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and/or Rambus dynamic RAM (RDRAM). Additionally, the disclosed memory components of systems, system-implemented methods and/or computer-implemented methods described herein are intended to include, without being limited to including, these and/or any other suitable types of memory.

What has been described herein includes one or more mere examples of one or more systems and/or methods. It is, of course, not possible to describe every conceivable combination of components and/or system-implemented methods for purposes of describing the subject matter. Nonetheless, one of ordinary skill in the art can recognize that one or more further combinations and/or permutations of the disclosed subject matter are possible. Furthermore, to the extent that the terms "includes", "has", "possesses" and/or the like are used in the detailed description, claims, appendices and/or drawings, such terms are intended to be inclusive in a manner similar to the term "comprising" as "comprising" is interpreted when employed as a transitional word in a claim.

It will be understood that when an element is referred to as being "coupled" to another element, the term "coupled" can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling and/or another type of coupling.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance and/or illustration. For the avoidance of doubt, the subject matter disclosed herein is not limited by such examples. In addition, any aspect and/or design described herein as an "example" and/or "exemplary" is not necessarily to be construed as preferred and/or advantageous over other aspects or designs, nor is any aspect and/or design meant to preclude equivalent exemplary structures and/or techniques known to those of ordinary skill in the art.

The description of the one or more embodiments provided herein has been presented for purposes of illustration but is not intended to be exhaustive and/or limited to the one or more embodiments disclosed. One or more modifications and/or variations will be apparent to those of ordinary skill in the art without departing from the scope and/or spirit of the described embodiments. The terminology used herein was chosen to best explain the principles of the embodiments, practical application and/or technical improvement over technologies found in the marketplace, and/or to enable others of ordinary skill in the art to understand the one or more embodiments disclosed herein.

What is claimed is:

1. A method, comprising:
generating, by a steering control system, a pair of initial control requests based on a closed-loop control scheme;
generating, by the steering control system, a secondary pinion request being an output of an aggregation of the pair of control pinion requests; and
generating, by the steering control system, a motor torque request based on the secondary pinion request, wherein the secondary pinion request and the motor torque request are generated, by the steering control system, during different, non-overlapping time intervals.

2. The method of claim 1, wherein the secondary pinion request comprises one of a pinion torque request or a pinion angle request.

3. The method of claim 1, wherein the motor torque request is a final motor torque request to be issued to a motor controller, by the steering control system, for setting a torque of a motor.

4. The method of claim 1, further comprising:
generating, by the steering control system, the secondary pinion request based at least in part on an angle request from a driver assistance system.

5. The method of claim 3, further comprising:
generating, by the steering control system, the motor torque request absent arbitration between two or more penultimate motor torque requests from two or more different controller components.

6. The method of claim 4, further comprising:
generating, by the steering control system, haptic control feedback employing the angle request from the driver assistance system.

7. A steering control system, comprising:
a first controller that employs a closed-loop control scheme to generate a pair of initial control requests and that generates a secondary pinion request based on an aggregation of the pair of initial control requests; and
a second controller that, based on the secondary pinion request, generates a motor torque request, wherein the secondary pinion request and the motor torque request are generated during different, non-overlapping time intervals.

8. The steering control system of claim 7, wherein the secondary pinion request comprises a pinion torque request or a pinion angle request.

9. The steering control system of claim 7, wherein the motor torque request is a final motor torque request to be issued to a motor controller, by the steering control system, for setting a torque of a motor.

10. The steering control system of claim 9, wherein the second controller generates the motor torque request absent arbitration between two or more penultimate requests from two or more different controller components.

11. The steering control system of claim 7, wherein the secondary pinion request is generated by the first controller based at least in part on an angle request from a driver assistance system.

12. The steering control system of claim 7, wherein the first controller conducts a position overlay operation, and wherein the first controller generates a torque reference function or a position reference function.

13. A system, comprising:
a vehicle comprising
a motor controller,
a first controller that employs a closed-loop control scheme to generate a pair of initial control requests and that generates a secondary pinion request based on an aggregation of the pair of initial control requests, and
a second controller that, based on the secondary pinion request, generates a motor torque request to the motor controller, wherein the secondary pinion request and the motor torque request are generated during different, non-overlapping time intervals.

14. The system of claim 13, wherein the secondary pinion request comprises a pinion torque request or a pinion angle request.

15. The system of claim 13, wherein the motor torque request is a final motor torque request to be issued to the motor controller for setting a torque of a motor, and wherein the second controller generates the motor torque request absent arbitration between two or more penultimate requests from two or more different controller components.

16. The method of claim 1, wherein the first controller performs a position overlay based on at least one of the initial requests.

17. The method of claim 1, wherein the motor torque request is further based on a sensed pinion measurement not employed to determine the secondary pinion request.

18. The method of claim 1, wherein the pair of initial control requests comprises an initial pinion request and an advanced driver assistance system request.

19. The steering control system of claim 7, wherein the pair of initial control requests comprises an initial pinion request and an advanced driver assistance system request.

20. The system of claim 13, wherein the pair of initial control requests comprises an initial pinion request and an advanced driver assistance system request.

* * * * *